United States Patent
Carmel et al.

(10) Patent No.: US 7,356,527 B2
(45) Date of Patent: Apr. 8, 2008

(54) LOSSY INDEX COMPRESSION

(75) Inventors: David Carmel, Haifa (IL); Doron Cohen, Misgav (IL); Ronald Fagin, Los Gatos, CA (US); Eitan Farchi, Pardes Hanna (IL); Michael Herscovici, Haifa (IL); Yoelle Maarek, Haifa (IL); Aya Soffer, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 10/451,056

(22) PCT Filed: Dec. 19, 2001

(86) PCT No.: PCT/US01/49260

§ 371 (c)(1),
(2), (4) Date: Jan. 9, 2004

(87) PCT Pub. No.: WO02/054289

PCT Pub. Date: Jul. 11, 2002

(65) Prior Publication Data

US 2004/0158580 A1    Aug. 12, 2004

(51) Int. Cl.
*G06F 7/00* (2006.01)

(52) U.S. Cl. .................................. 707/5; 707/101
(58) Field of Classification Search ............... 707/100, 707/101, 102, 1–7
See application file for complete search history.

(56) References Cited

U.S. PATENT DOCUMENTS

| | | | | |
|---|---|---|---|---|
| 5,619,709 | A * | 4/1997 | Caid et al. ................. | 715/532 |
| 5,797,008 | A * | 8/1998 | Burrows ..................... | 707/101 |
| 5,819,260 | A * | 10/1998 | Lu et al. ...................... | 707/3 |
| 5,920,854 | A * | 7/1999 | Kirsch et al. ................ | 707/3 |
| 5,926,811 | A * | 7/1999 | Miller et al. ................. | 707/5 |
| 6,240,407 | B1 * | 5/2001 | Chang et al. ................ | 707/2 |
| 6,480,843 | B2 * | 11/2002 | Li ................................ | 707/5 |
| 6,907,427 | B2 * | 6/2005 | Franz et al. ................. | 707/7 |

* cited by examiner

*Primary Examiner*—Wilson Lee
(74) *Attorney, Agent, or Firm*—F. Chau & Associates, LLC

(57) ABSTRACT

An apparatus and method is provided for pruning an index of a corpus of text documents by creating an inverted index of terms appearing in the documents, wherein the index includes postings of the terms in the documents, ranking the postings in the index, and pruning from the index the postings below a given level in the ranking.

15 Claims, 2 Drawing Sheets

LOSSY INDEX COMPRESSION

TECHNICAL FIELD

The present invention relates generally to methods and systems for computerized searching in large bodies of textual data, and specifically to creating search indices.

BACKGROUND ART

Fast and precise text search engines are widely used in web and desktop applications. Emerging hand-held devices such as the Palm Pilot™ possess enough storage capacity to allow entire moderate-size document collections to be stored on the device for quick reference and browsing purposes. Equipping these devices with advanced index-based search capabilities is desired, but storage on hand-held devices is still rather limited.

Most advanced information retrieval (IR) applications create an inverted index in order to support high quality search services over a given collection of documents. An example of such a system is the Guru search engine, which is described by Maarek and Smadja in "Full text indexing based on lexical relations, an application: Software libraries", *Proceedings of the Twelfth Annual International ACM SIGIR Conference on Research and Development in Information Retrieval*, pages 198-206 (1989), which is incorporated herein by reference. Each document in the document collection is analyzed and represented by a vector profile of indexing units, or terms, based on the content of the document. A term might be a word, a pair of closely related words (lexical affinities), or a phrase. Each term in a document is stored in an index with an associated posting list.

A posting list comprises postings, wherein each posting comprises an identifier of a document containing the term, a score for the term in that document, and possibly some additional information about the occurrences of the term in the document, such as the number of occurrences and offsets of the occurrences. A typical scoring model used in many information retrieval systems is the tf-idf formula, described by Salton and McGill in *An Introduction to Modern Information Retrieval*, (McGraw-Hill, 1983), which is incorporated herein by reference. The score of term t for document d depends on the term frequency of t in d (tf), the length of document d, and the inverse of the number of documents containing t in the collection (idf).

An exemplary tf-idf formula is described by Chris Buckley, et al., in "New retrieval approaches using SMART: TREC 4," *Proceedings of the Fourth Text Retrieval Conference (TREC-4)*, pp. 25-48 (Gaithersberg, Md., November 1995), which is incorporated herein by reference. This formula provides that the score A(t, d) of document d for term t is $$A(t, d) = \frac{\log(1 + tf)}{\log(1 + avg_{tf})} * \log(N/N_t)/|d|$$

Here $avg_{tf}$ is the average term frequency in document d, N is the number of documents in the collection, $N_t$ is the number of documents containing term t, and $|d|$ is the length of document d. Usually, $|d|$ is approximated by the square root of the number of (unique) terms in d.

At search time, terms are extracted from a user's query, and their respective posting lists are retrieved from the inverted index. The document posting scores are accumulated to form document scores by summing the scores of postings pertaining to the same document. At the end of this process, the documents are sorted by their scores, and the documents with the top scores are returned.

Indexing a large document collection results in huge index files that are hard to maintain. There has been a large amount work in the field of index compression, resulting in smaller index files. Two complementary approaches exist in the art. One approach is compression at the data structure level, that is, retaining all index data while trying to obtain a more compact representation of posting lists. The other approach is pruning the index by deleting or combining terms, such as stop-word omission, and Latent Semantic Indexing (LSI). The primary goal of this sort of index pruning is to reduce "noise" in the indexing system by removing from the index terms that tend to reduce search precision, but its practical effect of reducing index size is very relevant to the subject of index compression.

In stop-word omission, language statistics are used to find words that occur so frequently in the language that they will inevitably occur in most documents. Words that are very frequent in the language (stop-words) are ignored when building an inverted index. Words such as "the" and "is" do not contribute to the retrieval task. The TREC collection, as presented in "Overview of the Seventh Text Retrieval Conference (TREC-7)," *Proceedings of the Seventh Text Retrieval Conference (TREC-7)* (National Institute of Standards and Technology, 1999), which is incorporated herein by reference, enumerates the frequency of words in common text documents. Ignoring the set of the 135 most frequent words in the TREC collection was found to remove about 25% of the postings (Witten, et al., *Managing Gigabytes*, Morgan Kaufinan Publishers, San Francisco, Calif., 1999, which is incorporated herein by reference).

Latent Semantic Indexing (LSI) is described, for example, by Deerweester, et al., in "Indexing by Latent Semantic Analysis", *Journal of the American Society for Information Science*, Vol. 41, No. 1, (1990), pp. 391-407, which is incorporated herein by reference. LSI represents the inverted index as a product of three matrices, using a statistical technique called "singular-value decomposition" (SVD). This representation enables the number of terms in the index to be reduced by keeping the most significant terms while removing all others. Both LSI and stop-word omission operate at the granularity of terms. In other words, they only enable pruning entire terms from the index, so that once pruned, the term no longer appears in the index at all. When a term is pruned, its entire posting list is removed from the index.

Dynamic pruning techniques decide during the document ranking process, after the index has already been created, whether certain terms or document postings are worth adding to the accumulated document scores, and whether the ranking process should continue or stop. An exemplary technique of this sort is described by Persin, "Document Filtering for Fast Ranking", *Proceedings of the 17th Annual International ACM-SIGIR Conference on Research and Development in Information Retrieval* (Dublin, Ireland, July 1994, Special Issue of the SIGIR Forum), pages 339-348, which is incorporated herein by reference. The dynamic techniques are applied for a given query, thus reducing query time. Dynamic techniques have no effect on the index size, since they are applied to an already-stored index.

DISCLOSURE OF INVENTION

In preferred embodiments of the present invention, an inverted index relating terms to documents in a collection is pruned at the granularity level of document postings, rather than at term-level granularity, as in systems known in the art. By appropriate selection of the postings to prune for a given term, as described hereinbelow, the size of the index can be substantially reduced without significantly affecting the search accuracy of the index from a user's point of view.

Preferably, metrics are determined for the document postings and are then applied in order to select the postings to remove from the inverted index. The metrics are applied in such a manner that when a user searches the compressed inverted index with a given query, the list of documents returned is substantially the same as the list of top-ranked documents returned by the same query in the unpruned index. The pruning methods of the present invention are lossy, since some document postings are removed from the index, as opposed to methods known in the art that compress the index by using compact data structures and representations for storing the data in the posting list. Lossy and non-lossy methods can complement each other. After pruning the index in a lossy fashion, the index can be further compressed in a non-lossy manner, thereby attaining a smaller index size than is possible with either one of the methods used alone.

There is therefore provided, in accordance with a preferred embodiment of the present invention, an apparatus for performing a method for indexing a corpus of text documents, including steps for:

creating an inverted index of terms appearing in the documents, the index including postings of the terms in the documents;

ranking the postings in the index; and pruning from the index the postings below a given level in the ranking.

Ranking the postings may include determining a separate ranking for each of at least some of the terms separately, and pruning the index may include pruning the separate ranking for each of at least some of the terms.

Preferably, pruning the index includes receiving at least one parameter from a user and setting the given level based on the parameter and the separate index ranking.

Furthermore, the at least one parameter preferably includes a number k of documents to retrieve from the index, and a number r of the terms permitted in a query, and setting the given level includes setting the level based on the score of one of the documents ranked k from the top in the ranking.

According to one embodiment, setting the given level preferably includes dividing the score of the one of the documents by r.

In another embodiment, the at least one parameter includes a number $\delta$, of the portion of the documents to retrieve from the ranking, and a number r, of the terms permitted in a query, and setting the given level includes setting the level based on the score of the first document out of the documents in the ranking, $\delta$, and r.

Preferably, setting the given level includes multiplying the score of the first document by $\delta$ and dividing by r.

In an alternative embodiment, pruning the index includes selecting the postings to prune based on information on a statistical distribution of queries in a search space with respect to the document postings.

Pruning the index may include receiving at least one parameter from a user and setting the given level based on the parameter and the index ranking.

The at least one parameter may include a number M of the scores to remain in the pruned inverted index.

Preferably, selecting the postings includes determining a probability of at least some of the terms and multiplying the posting scores for each of the at least some of the terms by the probability of the term, and ranking the index includes ranking all the postings by multiplied posting scores, and the given level includes the score of document M from the top of the ranking.

In a preferred embodiment, creating the index includes creating the index on a computer with large memory capacity and transferring the index after pruning to a device with limited memory capacity.

Preferably, the limited memory device includes a handheld computing device.

BRIEF DESCRIPTION OF DRAWINGS

The present invention will be more fully understood from the following detailed description of the preferred embodiments thereof, taken together with the drawings in which.

BEST MODE FOR CARRYING OUT THE INVENTION

Figure 1:
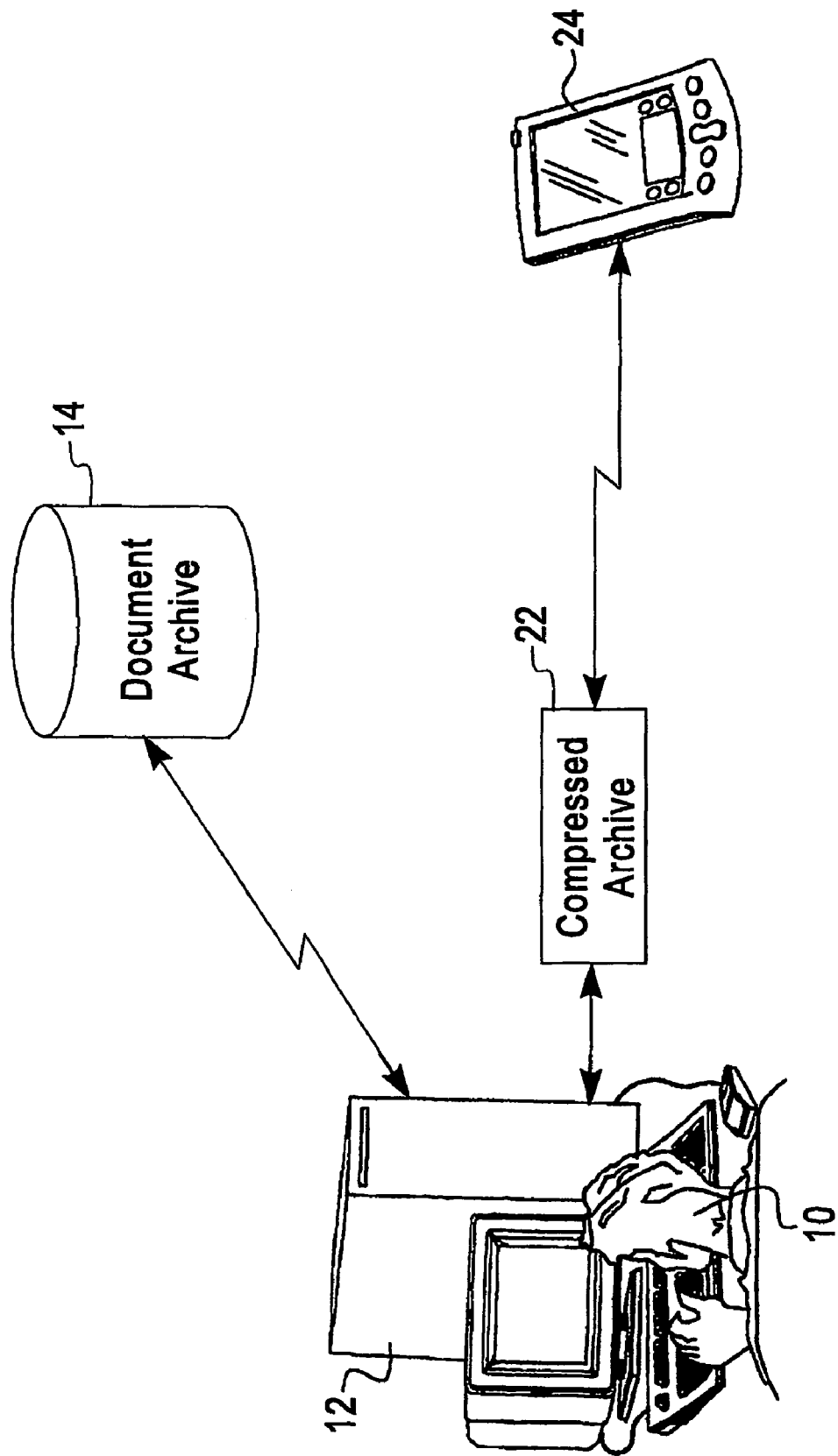
FIG. 1 is a schematic, pictorial illustration of a system for creating a search index, in accordance with a preferred embodiment of the present invention.

FIG. 1 is a schematic, pictorial illustration of a system for creating a compressed search index, in accordance with a preferred embodiment of the present invention. A user 10 uses an index processing device 12 to access a document archive 14. Documents retrieved from document archive 14 may be combined with an existing document archive on device 12. Device 12 creates a compressed inverted index 22 of the archive, using methods described in detail hereinbelow. Typically, the compressed index or archive 22 is transferred to a computing device 24. Device 24 is distinguished from device 12 by its limited ability to store large indices. Preferably the document archive used to create the index is transferred to device 24, as well. The user can then use device 24 to formulate queries into the document archive and to retrieve a list of appropriate documents, despite the limited storage capability of device 24.

Typically, device 12 comprises a desktop computer or server, while device 24 is a portable, pervasive device, such as a palm device or handheld computer, as shown in the figure. Alternatively, however, device 24 may comprise a desktop computer or other computer workstation.

Figure 2:
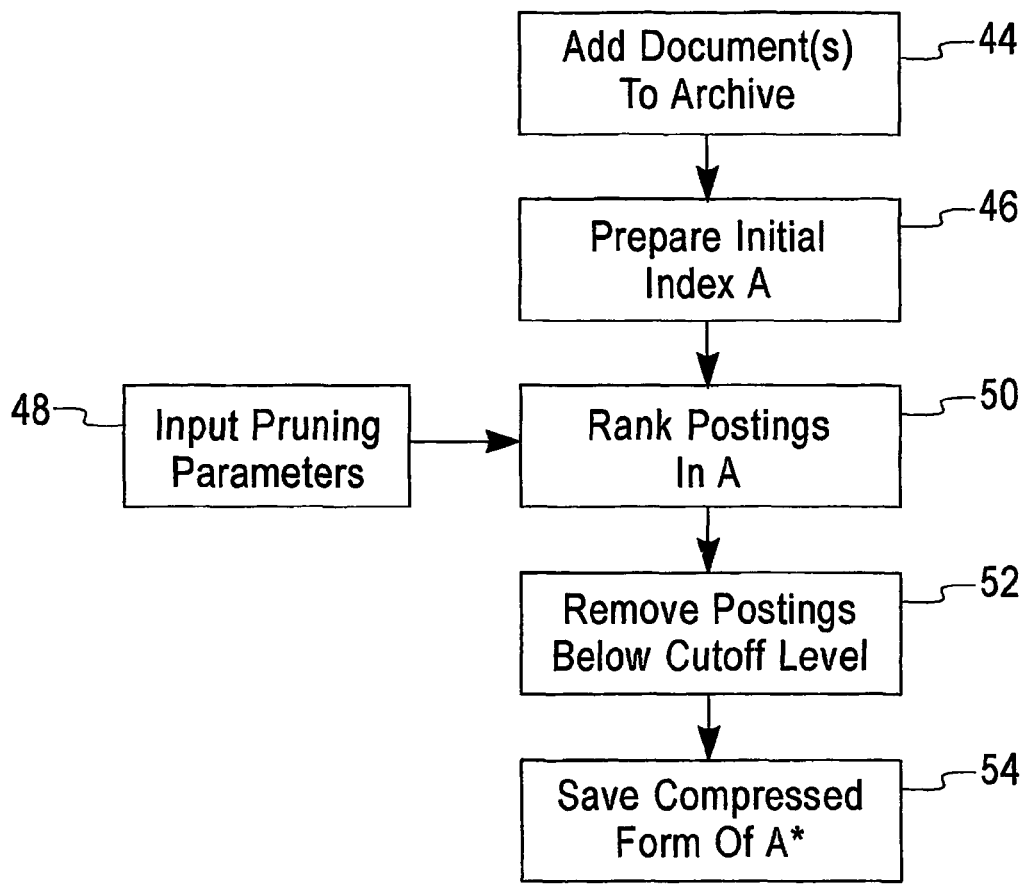
FIG. 2 is a flow chart that schematically illustrates a method for compressing indices, in accordance with a preferred embodiment of the present invention.

FIG. 2 is a flow chart that schematically illustrates a method for creating compressed inverted index 22, in accordance with a preferred embodiment of the present invention. The steps of this method are preferably carried out by suitable software running on device 12. The software may be supplied to device 12 in electronic form, by downloading over a network, or it may alternatively be supplied on tangible media, such as CD-ROM or non-volatile memory.

User 10 creates document archive 14 or adds documents to an existing archive at a document adding step 44. The index compression software creates an initial index A, at an index preparation step 46, by extracting terms from each document, creating a document posting for each term in each document, and listing the document postings in the index, as is known in the art.

Each document posting has a score associated with it, as described in the Background Art section. Various manners of calculation of the score are known in the art, and the manner chosen is not essential to the present invention. Rather, it is sufficient that $A(t, d)=0$ if t is not in d, $A(t,d)>0$ otherwise.

The user then inputs pruning parameters at a parameter input step 48. The parameters are used to rank the postings in index A at an index-ranking step 50.

A cutoff level in the rankings of the postings is determined that satisfies the conditions of the pruning parameters. All postings ranked below the cutoff level for a given term are deleted from index A. In this manner, a compressed index, referred to as index A*, is created at a posting removal step 52. This index may be further reduced in size by methods of term pruning and data structure compression known in the art, such as the methods described in the Background of the Invention. The compressed version of the index A* is stored as compressed index 22, at a index storage step 54.

The compressed index A* is, from the user's point of view, identical to the original index A. When the user queries either index A or A*, he receives a list of documents that are ranked according to their relevance to the query terms, based on the posting lists of the terms. By appropriate choice of pruning parameters at step 48 and application of the parameters at steps 50 and 52, it is assured that the list of documents returned by A* in response to the query, and the order of the documents in the list, will be substantially identical to the top of the list returned by A. This is generally the only part of the list that is of interest to users. In this sense, the methods of the present invention are analogous to methods of lossy compression of images and sound, wherein substantial reduction of data volume is achieved by sacrificing details that are, for the most part, imperceptible to the user.

Three preferred methods for specifying input parameters (step 48) and applying the parameters (steps 50 and 52) will now be described. The first two methods delete as many document postings as possible, while keeping the top answers returned by the pruned index in response to queries as close as possible to the top answers that would be returned by the original index. The closeness is measured using a top-answers metric that is determined by the similarity between the set of top results returned by the original index to the set of top results returned by the pruned index.

The third method, a uniform document posting pruning method, removes as many document postings as necessary to achieve a given index size, while keeping an expected error as small as possible. The expected error is measured using a metric which is defined as the sum over all possible queries of the differences between the document scores returned by the original and compressed indices for each query.

The compressed index is defined as identical to the original index if, for any given query, both return identical "top answers" to the query. Two of the preferred embodiments of the invention derive from two possible measures for "top answers":

The "k-top answers" method defines the "top answers" as the k documents with the highest scores for a query, wherein k is input at step 48. Define r as the maximum allowable number of terms in any query. For each term t, the values $A(t, d_0), A(t, d_1), \ldots$, are ranked according to their magnitudes at step 50. Let $z_t$ be the magnitude of the k'th term in the ranking. Then at step 52, $A^*(t, d)$ is set to 0 if $A(t, d)<z_t/r$, while $A^*(t, d)=A(t, d)$ otherwise. Postings for which $A^*(t, d)=0$ are, of course, removed from the index.

The "δ-top answers" method defines the "top answers" in terms of a threshold on the distance from the top score of the scoring function for a given query, wherein δ is input at step 48. For instance, for $\delta=0.9$, any document with a higher score than 90% of the top score is regarded as a top answer. Here, too, the values of $A(t, d)$ are ranked at step 50. At step 52, for each term t, the maximum value $\max(A(t, d))$ is found. Let $z_t=\delta*\max(A(t, d))$. Then $A^*(t, d)=0$ if $A(t, d)<z_t/r$ and $A^*(t, d)=A(t, d)$ otherwise. Postings for which $A^*(t, d)=0$ are, of course, removed from the index.

Figure 3:
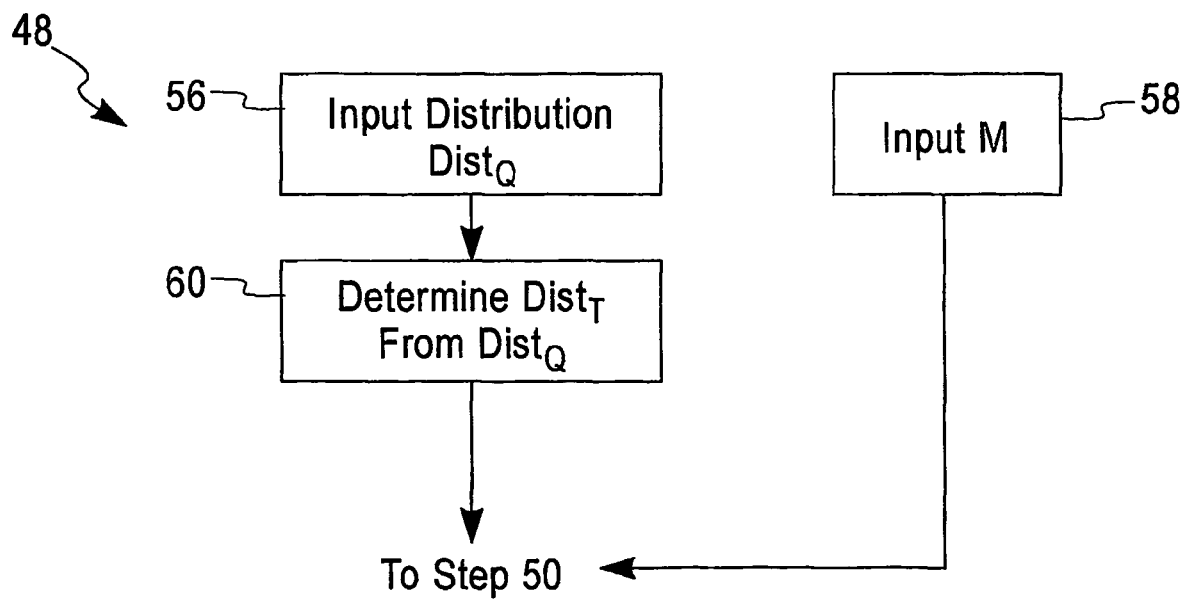
FIG. 3 is a flow chart that schematically shows details of a technique for inputting pruning parameters used in the method of FIG. 2, in accordance with a preferred embodiment of the present invention.

FIG. 3 expands pruning parameter input step 48 for the third, uniform posting pruning method noted above. An external process determines the probability distribution of the set of all possible queries $Dist_q$, at a distribution input to the system at the pruning parameter input step 55. $Dist_q$ can be obtained, for example, from the distribution of terms in the language, from a query log file of a search engine, or from any other suitable method. The distribution of the terms in the index $Dist_t$ is induced from the queries and $Dist_q$ at a determination step 56. The term distribution reflects the probability that a term t will appear in a query submitted to the search engine. The probability of a term appearing can be expressed in terms of query probabilities as $$\Pr(t) = \sum_{q \, in \, Q, t \, in \, q} \Pr(q)$$

where Q is the set of all possible queries. The user inputs a desired number of postings M to preserve in the index A* at an input step 58. Then the third preferred embodiment of index compression ranks the values of A are ranked at step 50, and A* is created at step 52 as follows. First, a scoring index A' is created based on A and $Dist_t$: $A'(t, d)=\Pr(t)A(t, d)$. All the scores in A' are ranked, and z is determined so that there are exactly M scores in A' greater than z. Note that in this method, z is a global parameter over A', rather than per term t as in the first two methods described above. Then $A^*(t, d)=0$ if $A'(t, d)<z$ and $A^*(t, d)=A(t, d)$ otherwise.

The inventors have tested these three methods on empirical data using the Los-Angles Times data given in TREC, which contains about 132,000 documents. In order to improve the method performance, the original index was modified. For each term, the minimum score in all the document postings for that term was subtracted from all the other scores. After this correction to the methods described above, the top-k pruning method allowed pruning of up to 25% of the document postings without significantly degrading search results, using the top 10 scores per term and queries of ten terms or less. The top-δ pruning method allowed pruning of up to 20% of the document postings without significantly degrading search results, using the top 70% of the scores per term and queries of ten terms or less. Both the top-k and the top-δ methods performed better than the uniform posting pruning method for the document archive chosen.

INDUSTRIAL APPLICABILITY

The invention is capable of exploitation in industry by providing, for example, apparatus for indexing a corpus of text documents including an index processor which is arranged to create an inverted index of terms appearing in the documents, the index including postings of the terms in the documents, the processor being further arranged to create rankings of the postings in the index, and prune from the index the postings below a given level in the ranking.

The invention may also be made and used by providing, in accordance with a preferred embodiment, a computer software product for indexing a corpus of text documents, including a computer-readable medium in which program instructions are stored, which instructions, when read by a computer, cause the computer to create an inverted index of terms appearing in the documents, the index including postings of the terms in the documents, the instructions further cause the computer to rank the postings in the index, and prune from the index the postings below a given level in the ranking.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for indexing a corpus of text documents, comprising:
    an index processor configured to generate an inverted index of entries for terms appearing in a plurality of documents,
    each entry including a term present in the plurality of documents and a plurality of postings,
    each posting including an identifier that represents a document of the plurality of documents and a ranking that represents a rank of the term in the document,
    the index processor being further configured to update the ranking for each posting and to compress the inverted index by deleting a posting having a ranking set below a given level to generate a compressed inverted index.

2. Apparatus according to claim 1, wherein the processor is arranged to determine a separate ranking for each of at least some of the terms separately, and to prune the separate ranking for each of at least some of the terms.

3. Apparatus according to claim 2, further comprising a user interface for receiving at least one parameter, wherein the processor is arranged to set the given level based on the parameter and the separate ranking.

4. Apparatus according to claim 3, wherein the at least one parameter comprises a number k of documents to retrieve from the index, and a number r of the terms permitted in a query, and wherein the processor is arranged to set the level based on the score of one of the documents ranked k from the top in the ranking.

5. Apparatus according to claim 4, wherein the processor is arranged to set the given level by dividing the score of the one of the documents by r.

6. Apparatus according to claim 3, wherein the at least one parameter comprises a number δ, of the portion of the documents to retrieve from the ranking, and a number r, of the terms permitted in a query, and wherein the processor is arranged to set the given level based on the score of the first document out of the documents in the ranking, δ, and r.

7. Apparatus according to claim 6, wherein the processor is arranged to multiply the score of the first document by δ and divide by r.

8. Apparatus according to claim 1, wherein the processor is arranged to select the postings to prune based on information on a statistical distribution of queries in a search space with respect to the document postings.

9. Apparatus according to claim 8, further comprising a user interface for receiving at least one parameter, wherein the processor is arranged to set the given level based on the parameter and the rankings of the postings.

10. Apparatus according to claim 9, wherein the at least one parameter comprises a number M of the scores to remain in the compressed inverted index.

11. Apparatus according to claim 10, wherein the processor is arranged to determine a probability of at least some of the terms and to multiply the posting scores for each of the at least some of the terms by the probability of the term, and to rank all the postings by the multiplied posting scores, and wherein the given level comprises the score of document M from the top of the rankings of the postings.

12. Apparatus according to claim 1, wherein the index processor is a computer having large memory capacity, and comprises apparatus for transferring the compressed inverted index to a device with limited memory capacity.

13. Apparatus according to claim 12, wherein the device with limited memory capacity comprises a handheld computing device.

14. A computer-implemented method for indexing a corpus of text documents, comprising the steps of:
    generating an inverted index of entries for terms appearing in a plurality of documents, each entry including a term present in the plurality of documents and a plurality of postings, each posting including an identifier that represents a document of the plurality of documents and a ranking that represents a rank of the term in the document,
    determining a score for each posting and updating the ranking of each posting based on the score; and
    compressing the inverted index by deleting a posting having a ranking set below a given level to generate a compressed inverted index.

15. A program storage device readable by a machine, tangibly embodying a program of instructions executable by the machine to perform method steps for indexing a corpus of text documents, the method steps comprising:
    generating an inverted index of entries for terms appearing in a plurality of documents, each entry including a term present in the plurality of documents and a plurality of postings, each posting including an identifier that represents a document of the plurality of documents and a ranking that represents a rank of the term in the document,
    determining a score for each posting and updating the ranking of each posting based on the score; and
    compressing the inverted index by deleting a posting having a ranking set below a given level to generate a compressed inverted index.

* * * * *